US009967886B2

(12) United States Patent
Ho et al.

(10) Patent No.: US 9,967,886 B2
(45) Date of Patent: May 8, 2018

(54) HIERARCHICAL BEAMFORMING METHOD AND BASE STATION AND USER EQUIPMENT USING THE SAME

(71) Applicant: Industrial Technology Research Institute, Hsinchu (TW)

(72) Inventors: Chung-Lien Ho, Hsinchu (TW); Ren-Jr Chen, Hsinchu (TW); Yi-Ting Wang, Hsinchu County (TW); Wen-Chiang Chen, Hsinchu (TW); Pang-An Ting, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 181 days.

(21) Appl. No.: 14/953,008

(22) Filed: Nov. 26, 2015

(65) Prior Publication Data

US 2016/0165583 A1 Jun. 9, 2016

Related U.S. Application Data

(60) Provisional application No. 62/087,204, filed on Dec. 3, 2014.

(30) Foreign Application Priority Data

Oct. 2, 2015 (TW) .............................. 104132653 A (51) Int. Cl.
*H04W 72/06* (2009.01)
*H04W 72/04* (2009.01)
(Continued)

(52) U.S. Cl.
CPC ........ *H04W 72/046* (2013.01); *H04B 7/0408* (2013.01); *H04B 7/0617* (2013.01);
(Continued)

(58) Field of Classification Search
CPC .. H04B 7/0408; H04B 7/0617; H04B 7/0695; H04L 45/74; H04W 72/0406; H04W 72/046; H04W 72/06; H04W 72/14
See application file for complete search history.

(56) References Cited

U.S. PATENT DOCUMENTS 8,594,053 B2 11/2013 Kim et al.
9,014,311 B1 4/2015 Cudak et al.
(Continued)

FOREIGN PATENT DOCUMENTS

CN 102318406 1/2012
CN 103427893 12/2013
(Continued)

OTHER PUBLICATIONS

Zhouyue Pi, et al., "An Introduction to Millimeter-Wave Mobile Broadband Systems," IEEE Communications Magazine, Jun. 2011, pp. 101-107.
(Continued)

*Primary Examiner* — Awet Haile
(74) *Attorney, Agent, or Firm* — JCIPRNET (57) ABSTRACT

The present disclosure proposes a hierarchical beamforming method and a base station and a user equipment using the same. The method includes following steps. A network entry procedure is performed via a plurality of coarse beams by using a superframe header of a superframe corresponding to each of the coarse beams. In response to a success message associated with the network entry procedure being received, a network entry done message is transmitted by using a preferred coarse beam among the coarse beams. A user equipment (UE) connection is performed via a plurality of fine beams within a direction range of the preferred coarse beam, so as to determine a preferred fine beam by using a frame header of a basic frame corresponding to each of the fine beams, and perform a data packet transmission by using
(Continued)

a packet transmission block of the basic frame corresponding to the preferred fine beam.

36 Claims, 8 Drawing Sheets

(51) Int. Cl.
    *H04L 12/741*     (2013.01)
    *H04B 7/0408*     (2017.01)
    *H04B 7/06*     (2006.01)
    *H04W 72/14*     (2009.01)

(52) U.S. Cl.
    CPC .......... *H04B 7/0695* (2013.01); *H04L 45/74* (2013.01); *H04W 72/0406* (2013.01); *H04W 72/06* (2013.01); *H04W 72/14* (2013.01)

(56) References Cited

U.S. PATENT DOCUMENTS

| | | | |
|---|---|---|---|
| 2009/0238156 A1* | 9/2009 | Yong | H04B 7/0695 370/336 |
| 2009/0298502 A1 | 12/2009 | Hagerman et al. | |
| 2011/0182174 A1 | 7/2011 | Pi et al. | |
| 2011/0243040 A1 | 10/2011 | Khan et al. | |
| 2012/0307726 A1 | 12/2012 | Pi et al. | |
| 2012/0320874 A1* | 12/2012 | Li | H04W 48/12 370/331 |
| 2013/0059619 A1* | 3/2013 | Kim | H04W 72/046 455/509 |
| 2013/0064239 A1 | 3/2013 | Yu et al. | |
| 2013/0217404 A1 | 8/2013 | Jung | |
| 2014/0098912 A1 | 4/2014 | Yin et al. | |

FOREIGN PATENT DOCUMENTS

| | | |
|---|---|---|
| CN | 103765794 | 4/2014 |
| TW | 201424119 | 6/2014 |
| WO | 2013133645 | 9/2013 |

OTHER PUBLICATIONS

Wonil Roh, et al., "Millimeter-Wave Beamforming as an Enabling Technology for 5G Cellular Communications: Theoretical Feasibility and Prototype Results," IEEE Communications Magazine, Feb. 2014, pp. 106-113.

Sridhar Rajagopal, et al., "Antenna Array Design for Multi-Gbps mmWave Mobile Broadband Communication," 2011 IEEE Global Telecommunications Conference (GLOBECOM 2011), Dec. 5-9, 2011, pp. 1-6.

Farooq Khan, et al., "Millimeter-wave Mobile Broadband with Large Scale Spatial Processing for 5G Mobile Communication," 2012 50th Annual Allerton Conference on Communication, Control, and Computing (Allerton), Oct. 1-5, 2012, pp. 1517-1523.

Taeyoung Kim, et al., "Tens of Gbps Support with mmWave Beamforming Systems for Next Generation Communications," 2013 IEEE Global Communications Conference (GLOBECOM), Dec. 9-13, 2013, pp. 3685-3690.

Bei Yin, et al. "High-Throughput Beamforming Receiver for Millimeter Wave Mobile Communication," 2013 IEEE Global Communications Conference (GLOBECOM), Dec. 9-13, 2013, pp. 3697-3702.

"Search Report of European Counterpart Application", dated Feb. 3, 2016, p. 1-p. 7.

"Office Action of Taiwan Counterpart Application", dated Jul. 26, 2016, p. 1-p. 11.

\* cited by examiner

HIERARCHICAL BEAMFORMING METHOD AND BASE STATION AND USER EQUIPMENT USING THE SAME

CROSS-REFERENCE TO RELATED APPLICATION

This application claims the priority benefits of U.S. provisional application Ser. No. 62/087,204, filed on Dec. 3, 2014 and Taiwan application serial no. 104132653, filed on Oct. 2, 2015. The entirety of each of the above-mentioned patent applications is hereby incorporated by reference herein and made a part of this specification.

TECHNICAL FIELD

The present disclosure relates to a hierarchical beamforming method and a base station and a user equipment using the same method.

BACKGROUND

Despite the advancements in technologies, wireless communication technologies using the millimeter wave (also referred to as mmWave) are still facing certain technical difficulties. Basically, the first problem that use of the millimeter wave may encounter is severe attenuation of wave energy during transmission, which is highly related to millimeter wave communication systems operated in high frequency bands while using a sizable bandwidth for communication. More specifically, the millimeter wave communication systems use the frequency band with relatively high frequency for communication as compared to the third generation (3G) or the fourth generation (4G) communication systems which are commonly used nowadays. It can be known that an energy intensity of an electromagnetic wave signal received by a receiver is inversely proportional to a square of a signal transmitting distance and is proportional to a wavelength of the electromagnetic wave signal, such that the attenuation degree of the signal energy will be significantly increased if the millimeter wave communication systems use the high frequency signal with short wavelength. Also, the high frequency signal will also cause sudden reduction in the antenna aperture, which may result in decrement of the signal energy of the transmitting signal in the millimeter wave communication systems.

Further, because of the electromagnetic wave signal with high frequency band, the capability of the transmitting/receiving signals in the millimeter wave communication systems for penetrating obstacles is significantly reduced. Generally, with respect to the millimeter wave communication systems, a system performance thereof is very sensitive to the obstacles on the signal transmission path. That is, consideration regarding whether the signal transmission takes place in the Line of Sight (LOS) and the Non Line of Sight (NLOS) environment becomes very important. Moreover, the energy of the millimeter wave may also be absorbed by, for example, rainy days, oxygen and water steam in the air, and the like. In addition, in order to accomplish high data transmission efficiency, the millimeter wave communications use the sizable bandwidth (e.g., 500 MHz to 1 GHz) for the data transmission, which will significantly increase the noise energy and accordingly reduce the signal-to-noise ratio. Therefore, in order to ensure the communication quality, a transceiver in the millimeter wave systems usually requires use of a multiple antenna beamforming technology to reduce the attenuation of the signal energy, so as to improve the efficiency for gaining the transceiving signals.

Generally, in related art, an antenna array including multiple antennas is disposed on a base station/a user equipment, so that beams with directivity may be generated by the base station/the user equipment by controlling the antennas. The beamforming technologies accomplished by the antenna array is one of the key factors for influencing performance of a millimeter wave wireless communication system. More specifically, because the beams generated by the base station/the user equipment have adjustable beam direction and beam pattern, the beam direction and the beam pattern of the beams can directly influence whether a data transmission path can be established between the base station and the user equipment. For example, the base station can establish the data transmission path with the user equipment through a beam scan, and the beam scan is performed by the base station for the beams with limited coverage which are sequentially sent towards different directions within cellular cells. Therefore, beamwidth and coverage of the beam also become one of the important factors for determining a time required in establishment of the data transmission path between the base station and the user equipment. Accordingly, it has become one of important issues to be solved for persons skilled in the art as how to improve performance of the millimeter wave wireless communication system by using the beamforming method technologies.

SUMMARY

Accordingly, the present disclosure is directed to a hierarchical beamforming method and a base station and a user equipment using the same method.

The present disclosure provides a hierarchical beamforming method, which is adapted to a base station. The method includes following steps. A network entry procedure is performed via a plurality of coarse beams by respectively using a superframe header of a superframe corresponding to each of the coarse beams. A success message associated with the network entry procedure is received from one of the coarse beams. A user equipment connection is performed via a plurality of fine beams within a direction range of the preferred coarse beam, so as to determine a preferred fine beam from the fine beams by using frame headers of a plurality of basic frames respectively corresponding to the fine beams. A data packet transmission is performed by using a packet transmission block of the basic frame corresponding to the preferred fine beam.

The present disclosure provides a base station, which includes a transceiver circuit and a processing circuit. The transceiver circuit is configured to transmit and receive a wireless signal. The processing circuit is coupled to the transceiver circuit, and configured to: perform a network entry procedure via a plurality of coarse beams by respectively using a superframe header of a superframe corresponding to each of the coarse beams; receive a success message associated with the network entry procedure from one of the coarse beams; and perform a user equipment connection via a plurality of fine beams within a direction range of the preferred coarse beam, so as to determine a preferred fine beam from the fine beams by using frame headers of a plurality of basic frames respectively corresponding to the fine beams, and perform a data packet transmission by using a packet transmission block of the basic frame corresponding to the preferred fine beam.

The present disclosure provides a hierarchical beamforming method, which is adapted to a user equipment. The method includes the following steps. A network entry procedure is performed via a plurality of coarse beams by respectively using a superframe header of a superframe corresponding to each of the coarse beams. In response to transmitting a success message associated with the network entry procedure via a preferred coarse beam among the coarse beams, a network entry done message is received via the preferred coarse beam. A user equipment connection is performed via a plurality of fine beams within a direction range of the preferred coarse beam, so as to determine a preferred fine beam from the fine beams by using frame headers of a plurality of basic frames respectively corresponding to the fine beams, and perform a data packet transmission by using a packet transmission block of the basic frame corresponding to the preferred fine beam.

The present disclosure provides a user equipment, which includes a transceiver circuit and a processing circuit. The transceiver circuit is configured to transmit and receive a wireless signal. The processing circuit is coupled to the transceiver circuit, and configured to: perform a network entry procedure via a plurality of coarse beams by respectively using a superframe header of a superframe corresponding to each of the coarse beams; in response to a success message associated with the network entry procedure and transmitted via a preferred coarse beam among the coarse beams, receive a network entry done message via the preferred coarse beam; and perform a user equipment connection via a plurality of fine beams within a direction range of the preferred coarse beam, so as to determine a preferred fine beam from the fine beams by using frame headers of a plurality of basic frames respectively corresponding to the fine beams, and perform a data packet transmission by using a packet transmission block of the basic frame corresponding to the preferred fine beam.

Based on the above, the base station and the user equipment in the present disclosure can perform the network entry procedure via the coarse beams with greater beamwidth, and perform the data packet transmission via the fine beams with smaller beamwidth. Furthermore, the present disclosure further provides a frame format of the superframe. The base station and the user equipment can perform the network entry procedure by using the superframe header of the superframe transmitted via the coarse beams, and the basic frames within the superframe are transmitted via the corresponding fine beam and used for transmitting the data packets.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the present disclosure and, together with the description, serve to explain the principles of the present disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Reference will now be made with the accompanying drawings in order to provide a thorough understanding of the disclosed embodiments of the present disclosure for those skilled in the art. The inventive ideas can adopt various implementations, rather than being limited to these embodiments. Descriptions of the well-known parts are omitted in the present disclosure, and the same reference numbers are used in the present disclosure to refer to the same or like parts.

In the present disclosure, the term "base station" (BS) can represent various embodiments, which may include (but not limited to), for example, a home evolved node B (HeNB), an eNB, an advanced base station (ABS), a base transceiver system (BTS), an access point, a home base station, a relay, a scatterer, a repeater, an intermediate node, an intermediary and/or a satellite-based communication base station.

Figure 1A:
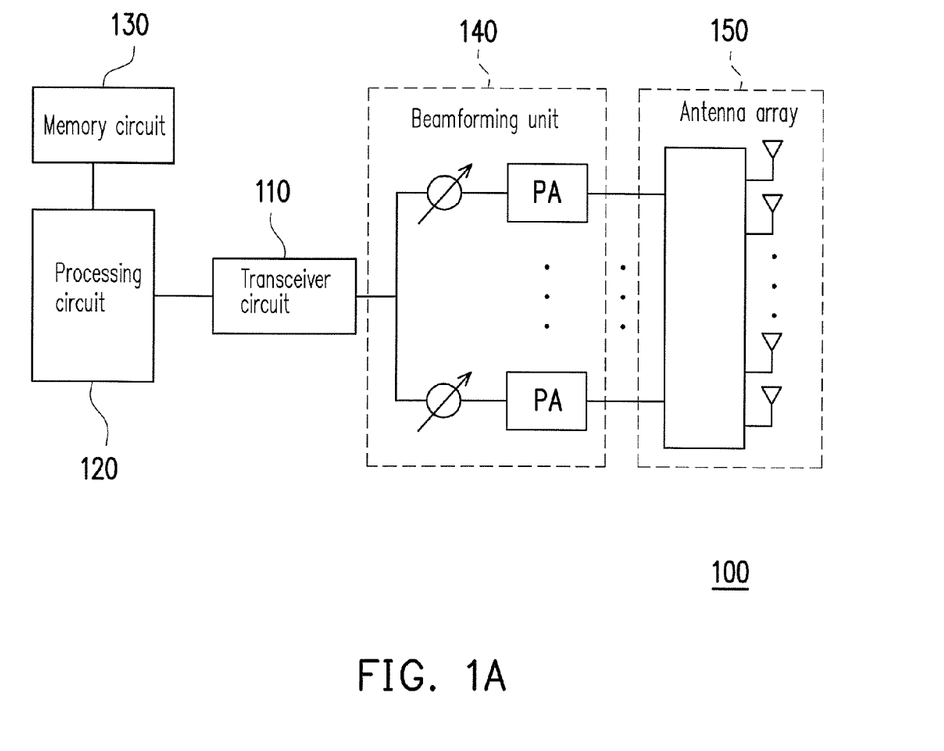
FIG. 1A is a block diagram illustrating a base station according to an exemplary embodiment of the present disclosure.

According to the embodiments of the present disclosure, the base station may at least be represented by function devices illustrated in FIG. 1A. A base station 100 may at least include (but not limited to) a transceiver circuit 110, a processing circuit 120, a memory circuit 130 (optional), a beamforming unit 140 and an antenna array 150.

The transceiver circuit 110 is capable of transceiving an uplink (UL) signal and/or a downlink (DL) signal in a wireless manner. The transceiver circuit 110 can also perform operations such as low noise amplifying, impedance matching, frequency mixing, frequency upconversion or downconversion, filtering, amplification and the like. For example, the transceiver circuit 110 may include an amplifier, a mixer, an oscillator, an analog-to-digital converter (ADC)/a digital-to-analog converter (DAC), a filter and the like. The analog-to-digital converter (ADC) is configured to convert an analog signal format into a digital signal format during an uplink signal processing period, whereas the digital-to-analog converter (DAC) converts a digital signal format into an analog signal format during a downlink signal processing period.

The beamforming unit 140 of the base station 100 can perform beamforming to the signals provided by the transceiver circuit 110. For example, the beamforming unit 140 includes a plurality of the phase converters and a plurality of power amplifiers (PA). As such, relative phases of the signals sent to each antenna of the antenna array 150 may be properly adjusted so that intensity of the signals in a designated direction is enhanced but compressed in other directions. In other words, with operation of the beamforming unit 140, the base station 100 can generate a plurality of beams in different beam directions or different beam patterns.

The processing circuit 120 is configured to process the digital signal and perform procedures in a hierarchical beamforming method according to the exemplary embodiments of the present disclosure. In addition, the processing circuit 120 may be optionally coupled to the memory unit 130, so as to store a programming code, a device configuration, a codebook, and buffer or permanent data, and record a plurality of modules executable by the processor 120. Functions of the processing circuit 120 may be implemented by using a programmable unit, such as a microprocessor, a microcontroller, a digital signal processing (DSP) chip, a field programmable gate array (FPGA) and the like. The functions of the processing circuit 120 may also be implemented by an independent electronic device or an integrated circuit (IC), and the processing circuit may also be implemented in form of hardware or software.

In the present disclosure, the term "user equipment" (UE) may represent various implementations, which may include (but not limited to), for example, a mobile station, an advanced mobile station (AMS), a server, a user terminal, a desktop computer, a laptop computer, a network computer, a workstation, a personal digital assistant (PDA), a personal computer (PC), a scanner, a phone device, a pager, a camera, a television, a handheld video game device, a music device, a wireless sensor and the like. In some applications, the UE may be a fixed computer device operated in a mobile environment such as on a bus, a train, a plane, a boat, a car and the like.

Figure 1B:
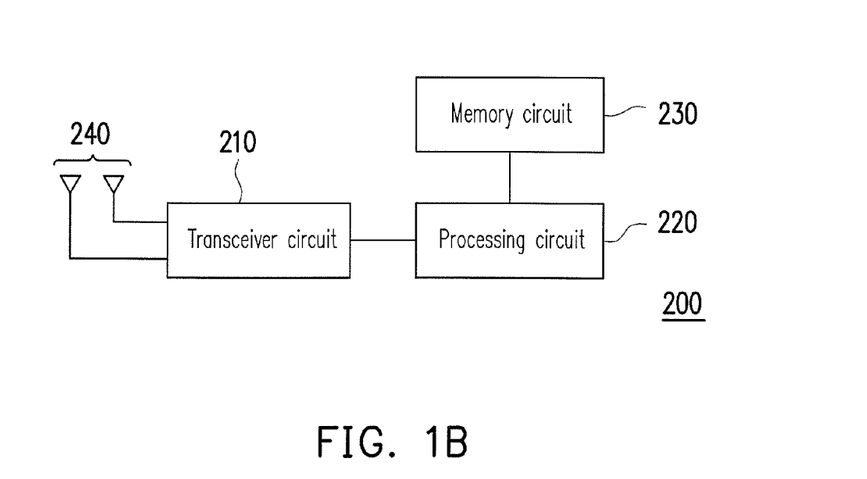
FIG. 1B is a block diagram illustrating a user equipment according to an exemplary embodiment of the present disclosure.

According to the embodiments of the present disclosure, the UE may at least be represented by function devices illustrated in FIG. 1B. A user equipment 200 may at least include (but not limited to) a transceiver circuit 210, a processing circuit 220, a memory circuit 230 (optional), and one or more antenna units 240. The memory unit 230 can store a programming code, a device configuration, buffer or permanent data, a codebook and the like. The processing circuit 220 may also be implemented in form of hardware or software. Functions of each element in the user equipment 200 are similar to those in the base station 100, and thus detailed description for each element is not repeated hereinafter. Although it is not illustrated in FIG. 1B, in an exemplary embodiment, the user equipment 200 may also include a beamforming unit for communicating with the base station 100 by using the beams with directivity.

In the exemplary embodiments of the present disclosure, a cellular system operated in an extremely high frequency band can reduce the high transmission path loss by using an antenna gain acquired based on the beamforming technology. Aforesaid high frequency band is, for example, a millimeter wave frequency band around 38 GHz, but the present disclosure is not limited thereto. The beamforming technology is a technology for sending signals from multiple antennas so that the signals may be gathered in a specific direction. The base station 100 can adjust the phase of the signal emitted from each of the antennas so the signals sent from all the antennas may be gathered in the specific direction to generate directional beams, such that the beams sent by the base station 100 may be received by the user equipment 200 located in the specific direction.

In the exemplary embodiments of the present disclosure, the base station 100 can send a plurality of coarse beams and a plurality of fine beams with different beam directions within one cell. In the present disclosure, the coarse beam and the fine beam are different in terms of their beamwidths. In the case where the coarse beams are provided by the base station 100, because the antenna gain is lower but supports wider beamwidth, a time required by the user equipment 200 for performing a beam acquirement is reduced. Conversely, in the case where the fine beams are provided by the base station 100, it is expected that the antenna gain is high but the service area is very small due to narrower beamwidth, such that the time required by the user equipment 200 for performing the beam acquirement is increased.

Accordingly, the present disclosure provides a hierarchical beamforming method, in which the base station 100 and the user equipment 200 can first perform a network entry process by using the coarse beams with wider beamwidth, and then perform a user equipment connection by using the fine beams with narrower beamwidth. The network entry procedure may be a network camp-on procedure, a handover procedure, a fallback procedure and the like.

Figure 2A:
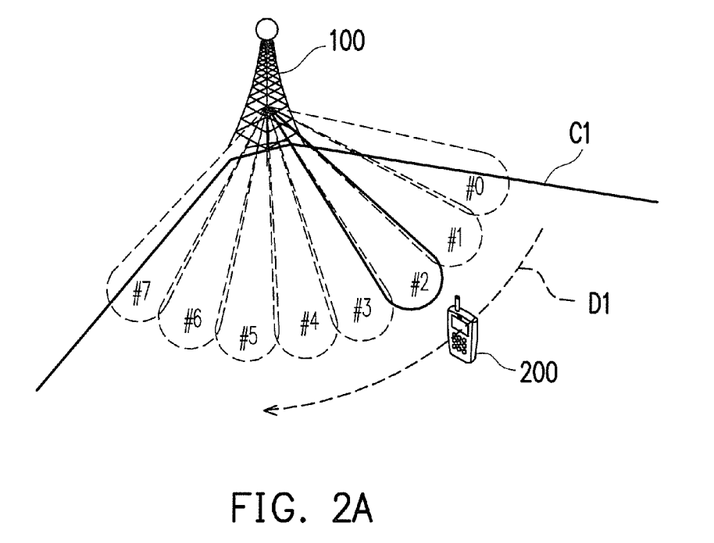
FIGS. 2A and 2B are schematic diagrams illustrating a hierarchical beamforming method according to an exemplary embodiment of the present disclosure.
Figure 2B:
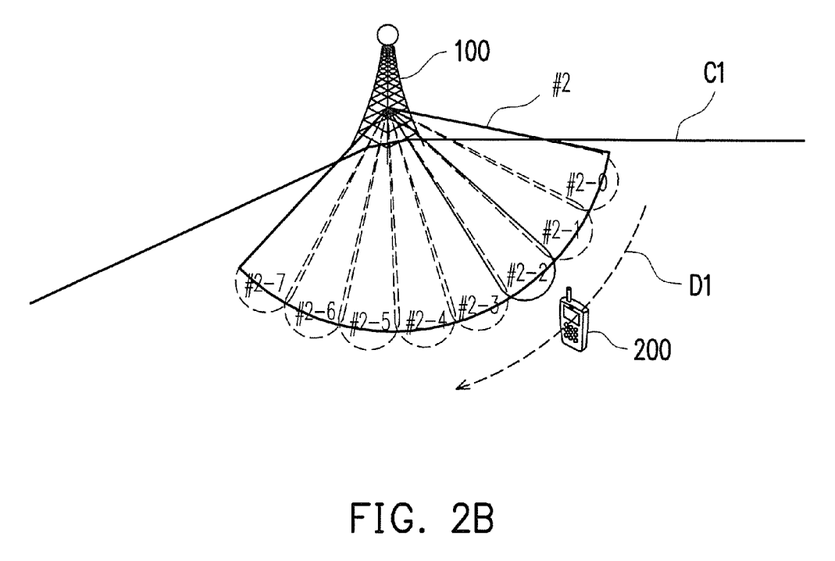

FIGS. 2A and 2B are schematic diagrams illustrating a hierarchical beamforming method according to an exemplary embodiment of the present disclosure. Referring to FIG. 2A first, the base station 100 can sequentially form a plurality of coarse beams towards different directions within a cell C1. In the present exemplary embodiment, the base station 100 can generate 8 coarse beams #0 to #7 with different beam directions, and the base station 100 can sequentially form the coarse beams #0 to #7 according to a clockwise direction D1, for example. The coarse beams #0 to #7 can cover the entire cell C1. In other words, the base station 100 can generate the coarse beams #0 to #7 for covering the entire cell C1 by switching the beam direction 7 times.

When the user equipment 200 enters the cell C1, the user equipment 200 and the base station 100 can perform the network entry procedure via at least one of the coarse beams #0 to #7, so that the user equipment 200 can synchronize with the base station 100 and acquire network system information. Take FIG. 2A as an example, the user equipment 200 can receive at least one beam search signal transmitted via a part of the coarse beams #0 to #7 and perform a coarse beam search to select the coarse beam #2 as a preferred coarse beam for performing the network entry procedure.

Thereafter, referring to FIG. 2B, the base station 100 can send a plurality of fine beams within a direction range of the preferred coarse beam. In the present exemplary embodiment, the base station 100 can generate 8 fine beams #2-0 to #2-7 with different beam directions, and the base station 100 can sequentially form the fine beams #2-0 to #2-7 according to the clockwise direction D1, for example. Direction ranges of the fine beams #2-0 to #2-7 within the direction range of the coarse beam #2 are different from one another and overlapped with the direction range of the coarse beam #2. The base station 100 can use a part or all of the fine beams #2-0 to #2-7 to perform the user equipment connection, so as to select a preferred fine beam from the part or all of the fine beams #2-0 to #2-7. Take FIG. 2B as an example, the fine beam #2-2 is selected as the preferred fine beam, and the base station 100 and the user equipment 200 already entered the network can perform a data packet transmission by using the fine beam #2-2.

It should be noted that, forming sequences and numbers of the coarse beams and forming sequences and numbers of the fine beams are not particularly limited in the present disclosure. However, it can be known that, the number of the fine beams within one cell is greater than the number of the coarse beams, and a beamwidth of the coarse beams is greater than a beamwidth of the fine beams. In view of FIG. 2A and FIG. 2B, it can be known that, a coarse beam search and a coarse beam acquirement related to the coarse beams are performed before performing a fine beam search and a fine beam acquirement related to the fine beams. In other words, the base station 100 and the user equipment 200 first perform the network entry procedure by using the preferred coarse beam, and then perform the user equipment connection by using the fine beams within the direction range of the preferred coarse beam, so as to perform the data packet transmission by using the preferred fine beam.

Figure 3A:
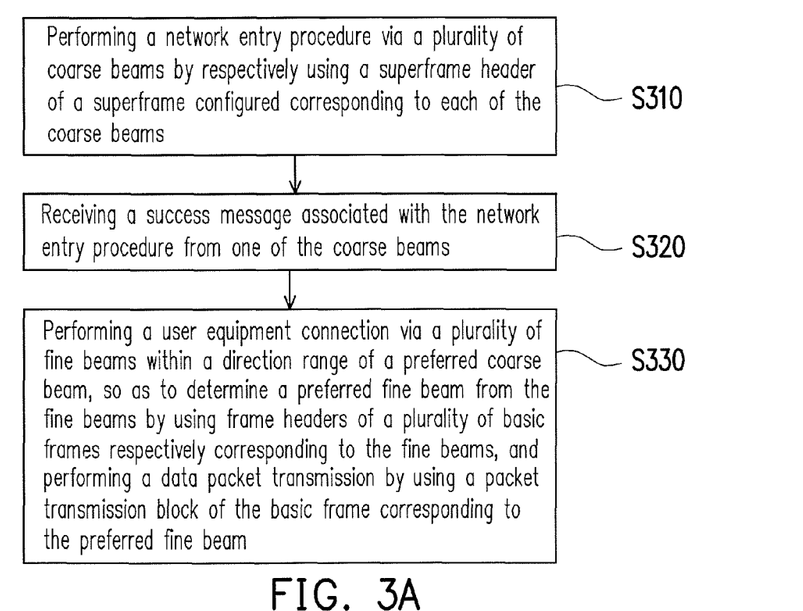
FIG. 3A is a flowchart illustrating the hierarchical beamforming method operated by the base station according to an exemplary embodiment of the present disclosure.

FIG. 3A is a flowchart illustrating the hierarchical beamforming method operated by the base station according to an exemplary embodiment of the present disclosure. In step S310, the processing circuit 120 performs is a network entry procedure via a plurality of coarse beams by using a superframe header of a superframe corresponding to each of the coarse beams. In step S320, in response to receiving a success message associated to the network entry procedure, the processing circuit 120 transmits a network entry done message by using a preferred coarse beam among the coarse beams. In step S330, the processing circuit 120 performs a user equipment connection via a plurality of fine beams within a direction range of the preferred coarse beam, so as to determine a preferred fine beam from the fine beams by using frame headers of a plurality of basic frames respectively corresponding to the fine beams, and performs a data packet transmission by using a packet transmission block of the basic frame corresponding to the preferred fine beam.

Figure 3B:
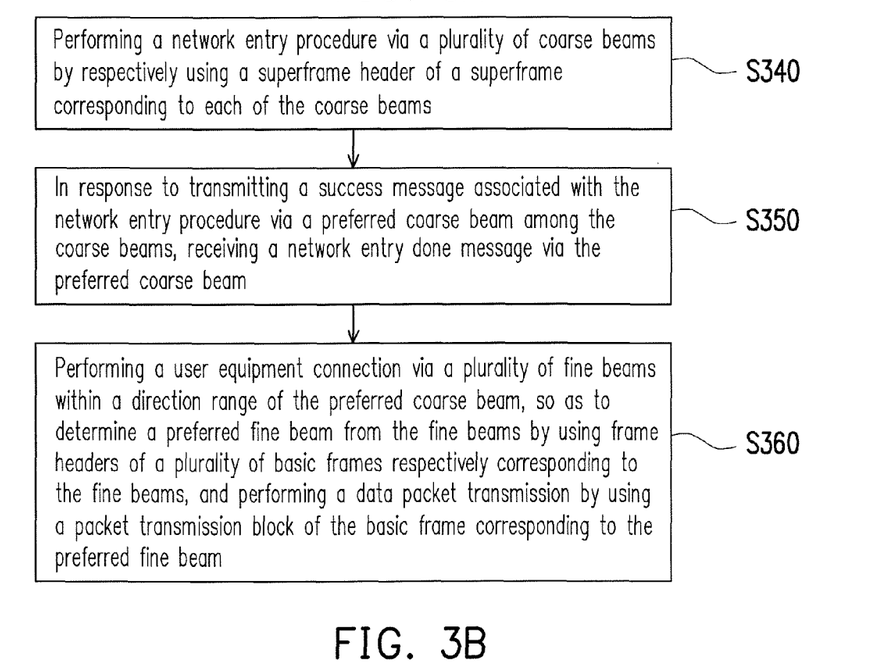
FIG. 3B is a flowchart illustrating the hierarchical beamforming method operated by the user equipment according to an exemplary embodiment of the present disclosure.

In contrast, FIG. 3B is a flowchart illustrating the hierarchical beamforming method operated by the user equipment according to an exemplary embodiment of the present disclosure. In step S340, the processing circuit 220 performs a network entry procedure via a plurality of coarse beams by respectively using a superframe header of a superframe corresponding to each of the coarse beams. In step S350, in response to transmitting a success message associated with the network entry procedure via a preferred coarse beam among the coarse beams, the processing circuit 220 receives a network entry done message via the preferred coarse beam. In step S360, the processing circuit 220 performs a user equipment connection via a plurality of fine beams within a direction range of the preferred coarse beam, so as to determine a preferred fine beam from the fine beams by using frame headers of a plurality of basic frames respectively corresponding to the fine beams, and perform a data packet transmission by using a packet transmission block of the basic frame corresponding to the preferred fine beam.

It should be noted that, the superframe defined in the present disclosure includes the superframe header, and the superframe header is located at the start of the superframe. The superframe header transmitted via each of the coarse beams can be loaded with network system information of the network entry procedure, a beam search signal, a cell search signal and a downlink control signal. For example, the beam search signal used in the coarse beam search may be sent via the coarse beams by using the corresponding superframe header. The beam search signal can provide the beam search, a frequency synchronism and timing information for the user equipment 200 under a coverage of the coarse beams. The cell search signal used in a cell search, such as a primary synchronization signal (PSS) and a secondary synchronization signal (SSS), may also be sent via the coarse beams by using the corresponding superframe header. The primary synchronization signal and the secondary synchronization signal can provide cell search information for the user equipment 200 under the coverage of the coarse beams. In an exemplary embodiment, the primary synchronization signal and the secondary synchronization signal may also provide the frequency synchronism and the timing information at the same time. A random access preamble related to a random access procedure may also be sent via the coarse beams by using the corresponding superframe header. The downlink control signal and a cell-specific reference signal (CRS) may also be sent via the coarse beams by using the corresponding superframe header. In other words, the base station 100 will periodically send the control signal and the system information related to the network entry procedure via each of the coarse beams and the corresponding superframe header.

As such, the user equipment 200 can select the preferred coarse beam according to a coarse beam signal parameter of each of the coarse beams, and determine to transmit the success message associated with the network entry procedure by using the preferred coarse beam. The coarse beam signal parameter may be a channel estimate parameter or a signal measure parameter, such as the received signal strength indicator (RSSI) or the signal-to-noise ratio (SNR) and the like. More specifically, in response to a plurality of measure signals respectively corresponding to the coarse beams received via the coarse beams, the user equipment 200 acquires a plurality of coarse beam signal parameters respectively corresponding to the coarse beams. Thereafter, the user equipment 200 selects the preferred coarse beam from the coarse beams according to the coarse beam signal parameters, so as to transmit the success message associated with the network entry procedure by using the preferred coarse beam.

On the other hand, the base station 100 can receive the success message associated with the network entry procedure from one of the coarse beams, identify said one of the coarse beams as the preferred coarse beam, and transmit back a network entry done message corresponding to the success message to the user equipment 200 by using the preferred coarse beam. Once the success message transmitted by the user equipment 200 is received by the base station 100 via the preferred coarse beam, the base station 100 may learn that the user equipment 200 is located within the coverage of the preferred coarse beam.

On the other hand, the superframe includes a plurality of basic frames. It should be particularly noted that, a first basic frame located at the start of one superframe includes the superframe header. The base station 100 and the user equipment 200 perform the user equipment connection via the fine beams by using the basic frames. It should be noted that, the start of one basic frame includes the frame header and is loaded with a fine beam search signal. It should also be noted that, the fine beam search signal and a coarse beam search signal are independent and different from each other. The base station 100 and the user equipment 200 perform the fine beam search by using the frame headers of the basic frames. In comparison with the periodically transmitted coarse beams, besides that the beam search signal loaded in the frame header of the basic frame can be periodically transmitted to perform the fine beam search, sending of the fine beams may also have the characteristic of dynamic scheduling according to communication environments and communication requirements. In other words, the fine beams may be adaptively formed according to the communication requirements, a channel criteria and a system networking capability of the user equipment 200. Specifically, the base station 100 can periodically send a beam search signal and/or a measure signal for the fine beam search by using the frame headers of the basic frames, and schedule the preferred fine beam used by the packet transmission block in the basic frame according to a result of the fine beam search and/or a signal measurement. In other words, the base station 100 can send the beam search signal and/or the measure signal for the fine beam search by using the frame headers of the basic frames, and schedule the packet transmission block of the basic frame transmitted via the preferred fine beam according to the result of the fine beam search and/or the signal measurement in order to perform the data packet transmission with the user equipment 200.

Figure 4A:
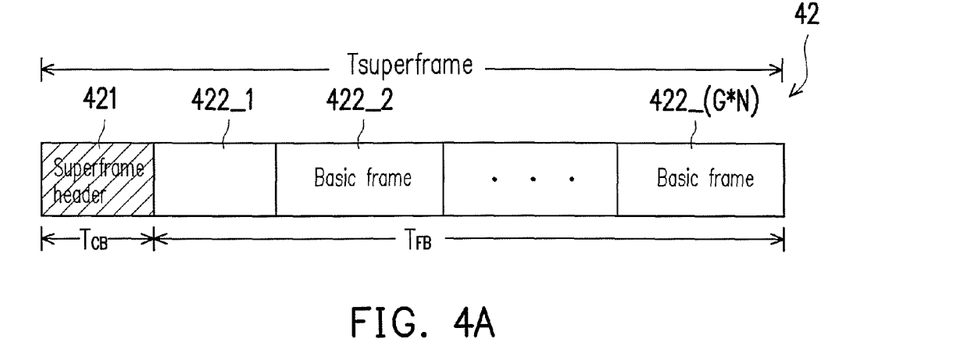
FIG. 4A is a schematic diagram illustrating the superframe according to an exemplary embodiment of the present disclosure.
Figure 4B:
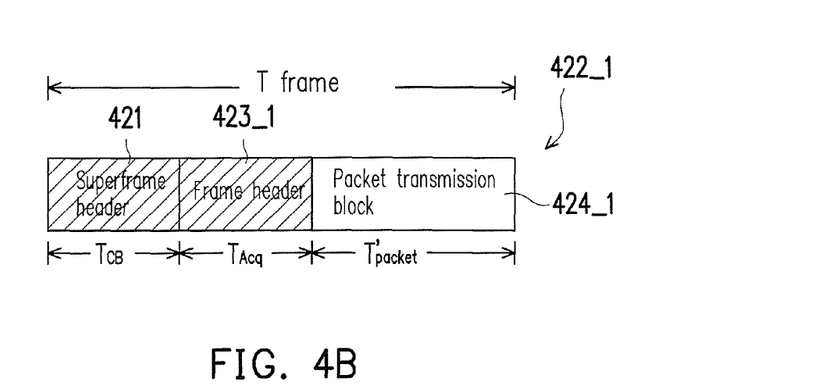
FIG. 4B is a schematic diagram illustrating the basic frame according to an exemplary embodiment of the present disclosure.
Figure 4C:
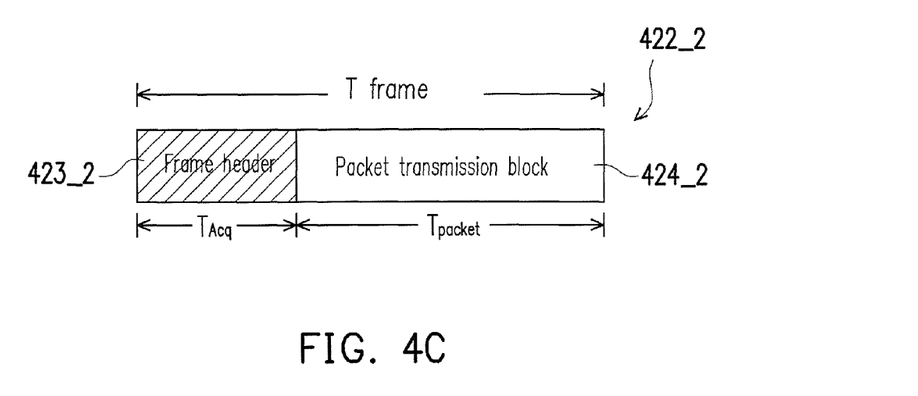
FIG. 4C is a schematic diagram illustrating the basic frame according to an exemplary embodiment of the present disclosure.

FIG. 4A is a schematic diagram illustrating the superframe according to an exemplary embodiment of the present disclosure. FIG. 4B is a schematic diagram illustrating the basic frame according to an exemplary embodiment of the present disclosure. FIG. 4C is a schematic diagram illustrating the basic frame according to an exemplary embodiment of the present disclosure. In the examples as shown in FIG. 4A to FIG. 4C, it is assumed that the base station 100 can form a M number of coarse beams with different beam directions within one cell, and send a N number of fine beams with different beam directions within a coverage of one coarse beam. Referring to FIG. 4A, a superframe 42 includes a superframe header 421, and the superframe 42 includes a (G*N) number of basic frames 422_1 to 422_(G*N), where a parameter G is a positive integer corresponding to the number of times the basic frame of the same fine beam is transmitted within a superframe duration. The base station 100 and the user equipment 200 can perform a coarse beam acquirement and the network entry procedure by using the superframe header 421, and the frame headers and the packet transmission blocks of the basic frames 422_1 to 422_(G*N) transmitted via the fine beams may be respectively used to perform the fine beam acquirement and the data packet transmission. In other words, during a coarse beam forming period $T_{CB}$, the base station 100 forms the coarse beams, and the superframe header 421 is transmitted via the coarse beams. During a fine beam forming period $T_{FB}$, the base station 100 forms the fine beams, and the frame headers and the packet transmission blocks of the basic frames 422_1 to 422_(G*N) are transmitted via the fine beams.

Referring to the basic frame 422_1 in FIG. 4B, for example, the basic frame 422_1 includes the superframe header 421, a frame header 423_1 and a packet transmission block 424_1. After the base station 100 and the user equipment 200 perform the network entry procedure by using the superframe header 421, the base station 100 and the user equipment 200 can perform the fine beam acquirement by using the frame header 423_1 transmitted via the fine beam. If the fine beam corresponding to the basic frame 422_1 is selected as the preferred fine beam, the base station 100 and the user equipment 200 can perform the data packet transmission via the preferred fine beam by using the packet transmission block 424_1. A frame duration $T_{frame}$ of the basic frame 422_1 is equal to a sum of the coarse beam forming period $T_{CB}$, a fine beam search period $T_{Acq}$ and a packet transmission period $T'_{packet}$.

It can be known that, except the basic frame 422_1 that includes the superframe header 421, the other basic frames 422_2 to 421_(G*N) do not include the superframe header 421. Referring to the basic frame 422_2 in FIG. 4C, for example, the basic frame 422_2 includes a frame header 423_2 and a packet transmission block 424_2. After the base station 100 and the user equipment 200 perform the network entry procedure by using the superframe header 421, the base station 100 and the user equipment 200 can perform the fine beam acquirement by using the frame header 423_2 transmitted via the fine beam. If the fine beam corresponding to the basic frame 422_2 is selected as the preferred fine beam, the base station 100 and the user equipment 200 can perform the data packet transmission via the preferred fine beam by using the packet transmission block 424_2. The frame duration $T_{frame}$ of the basic frame 422_2 is equal to a sum of the fine beam search period $T_{Acq}$ and a packet transmission period $T_{packet}$. Frame formats of the other basic frames 422_3 to 421_(G*N) are identical to a frame format of the basic frame 422_2, which are not repeated hereinafter.

In an exemplary embodiment of the present disclosure, if the fine beam search periods $T_{Acq}$ of the basic frames 422_1 to 421_(G*N) are the same (but the present disclosure is not limited thereto), as compared to the packet transmission period $T'_{packet}$ of the basic frame 422_1, the packet transmission period $T_{packet}$ of the basic frame 422_2 is longer. In an exemplary embodiment of the present disclosure, because the superframe 42 includes the (G*N) number of the basic frames, a superframe duration $T_{superframe}$ of the superframe 42 is equal to a product of the frame duration $T_{frame}$, the parameter G and the number of the fine beams N ($T_{superframe}=G*N*T_{frame}$ (milliseconds)).

Based on the superframe defined in the present disclosure, the base station 100 can periodically transmit the beam search signal, the cell search signal, the system information and the control signal related to and required by the network entry procedure via different coarse beams and the superframe header 421. In addition, the base station 100 can send the beam search signal and/or the measure signal for the fine beam search by using the frame headers of the basic frames, and schedule the basic frame transmitted via the preferred fine beam according to the result of the fine beam search in order to perform the data packet transmission with user equipment 200 via the fine beam and the scheduled basic frame. Therefore, whether the packet transmission block of the basic frame is scheduled may be dynamically determined according to the communication requirements, the channel criteria and the system networking capability of the user equipment 200.

Figure 5:
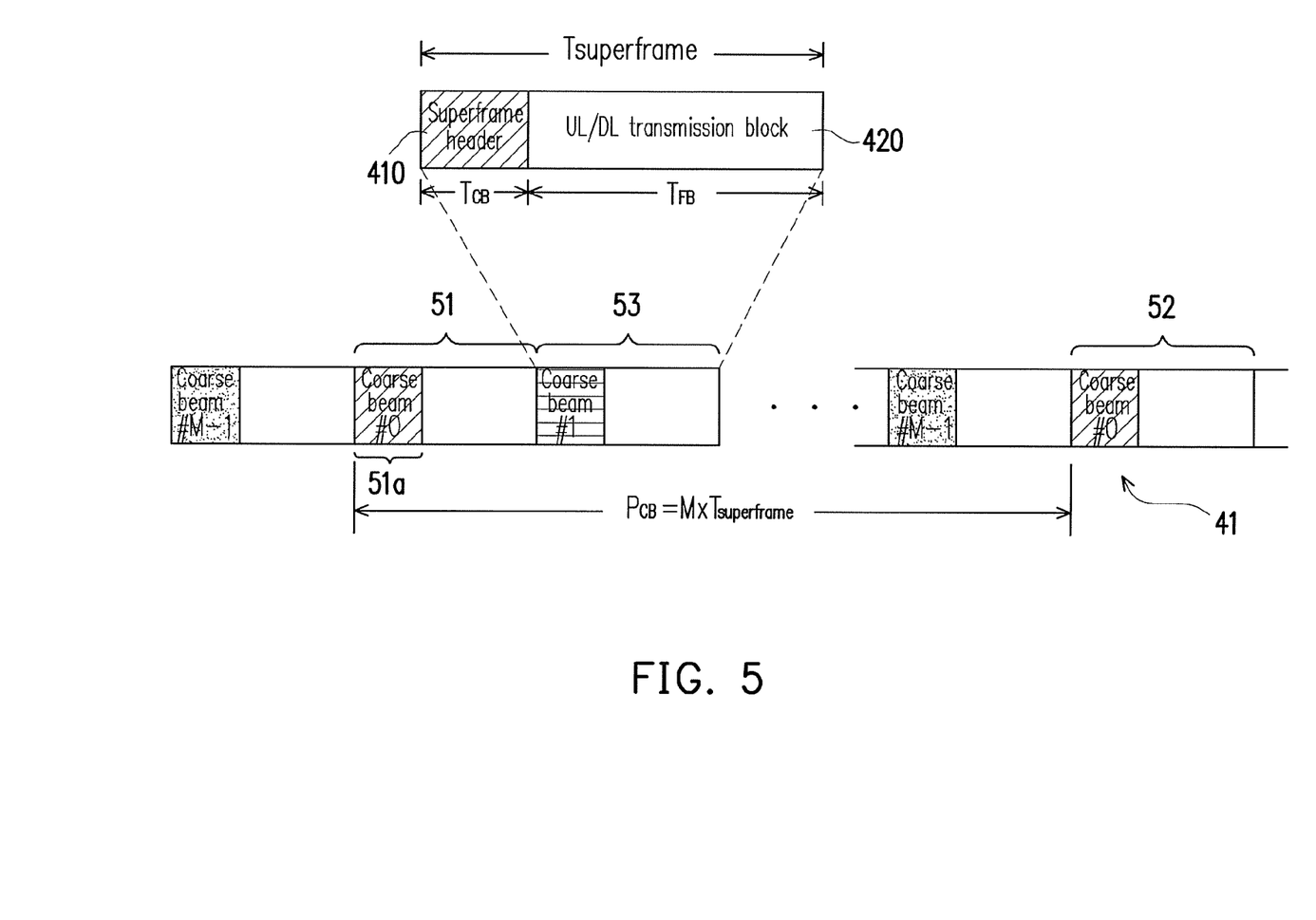
FIG. 5 is a schematic diagram illustrating the frame structure according to an exemplary embodiment of the present disclosure.

FIG. 5 is a schematic diagram illustrating the frame structure according to an exemplary embodiment of the present disclosure. Referring to FIG. 5, a frame structure 41 is used for a data transmission between the base station 100 and the user equipment 200. In the present exemplary embodiment, it is assumed that the base station 100 can send a M number of coarse beams with different beam directions within one cell, and the superframe corresponding to the same coarse beam appears once every M number of superframe durations $T_{superframe}$. As shown in FIG. 5, a coarse beam period $P_{CB}$ includes a M number of superframes respectively corresponding to the M number of the coarse beams with different beam directions, and M is a positive integer equal to the number of the coarse beams. Therefore, the coarse beam period $P_{CB}$ is equal to M times the superframe duration $T_{superframe}$ ($P_{CB}=M*T_{superframe}$ (milliseconds)). Furthermore, a (M−1) number of the superframes are present between the superframes 51 and 52, both corresponding to the coarse beam #0. The superframe 53 corresponding to the coarse beam #1 is adjacent to the superframe 51, which means that, the base station 100 sends the coarse beam #0 and the coarse beam #1 during the coarse beam period $P_{CB}$ in a sequence of sending the coarse beam #0 first before sending the coarse beam #1.

Based on the forgoing description of FIG. 4A, it can be known that the superframe of the present disclosure includes the superframe header and the basic frames. During the coarse beam forming period of the superframe, the base station 100 forms one of the coarse beams, and the superframe header is transmitted via said one of the coarse beams. For example, the superframe 53 includes a superframe 410 and an UL/DL transmission block 420. During the coarse beam forming period $T_{CB}$, the base station 100 forms the coarse beam #1, and the superframe header 410 is transmitted via the coarse beam #1. If each of the superframes in the frame structure 41 includes a N number of basic frames and each of the basic frames is repeatedly transmitted for a G number of times during a superframe duration, a (M*N*G) number of basic frames are included in the coarse beam period $P_{CB}$ and the coarse beam period $P_{CB}$ is equal to $M*N*G*T_{frame}$ (milliseconds).

In the case of M=4 (i.e., the base station 100 can form 4 coarse beams in different directions) and the superframe duration being 0.5 second ($T_{superframe}$=0.5), the coarse beam period $P_{CB}$ is equal to 2 seconds (0.5 second*4=2 seconds). The base station 100 switches to form the coarse beam with own beam direction once every 0.5 second. In other words, when the user equipment 200 enters the cell that the base station 100 is responsible for, after waiting for at most 2 seconds, the user equipment 200 can receive the beam search signal associated with the network entry procedure, the cell search signal, the system information and the control signal, and start to perform the network entry procedure accordingly.

More specifically, the base station 100 configures the superframe corresponding to each of the coarse beams, so as to associate the coarse beams with the corresponding superframe respectively. During the coarse beam period $P_{CB}$, the base station 100 continuously forms each of the coarse beams. The superframe header transmitted via each of the coarse beams is loaded with the network system information of the network entry procedure, the beam search signal, the cell search signal and the control signal. In other words, the signals associated with the network entry procedure in the superframe header are periodically delivered in a beacon-like manner.

Figure 6:
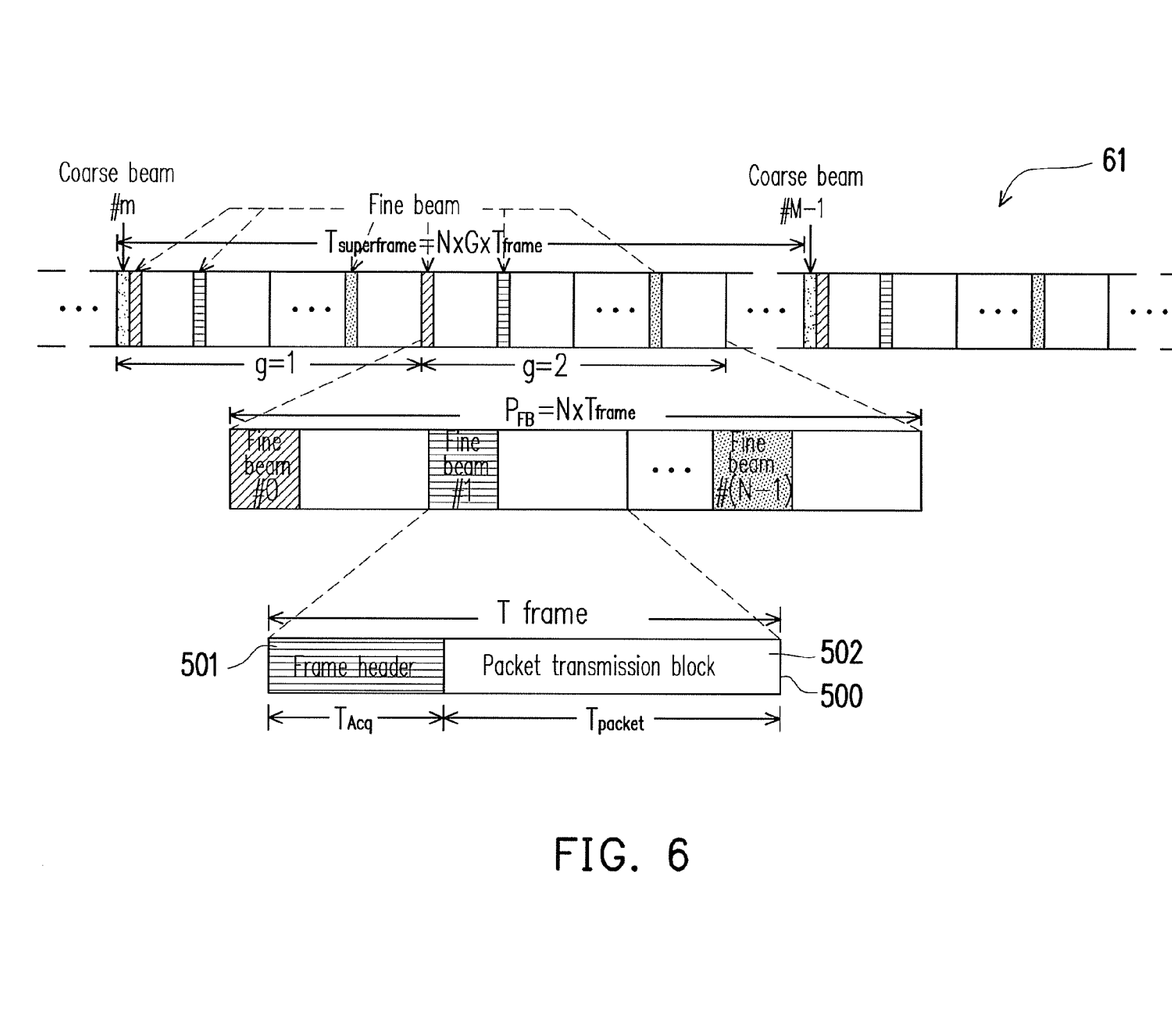
FIG. 6 is a schematic diagram illustrating the fine beam transmission according to an exemplary embodiment of the present disclosure.

FIG. 6 is a schematic diagram illustrating the fine beam transmission according to an exemplary embodiment of the present disclosure. Referring to FIG. 6, a frame structure 61 is used for a data transmission between the base station 100 and the user equipment 200. In the present exemplary embodiment, it is assumed that the base station 100 can send a N number of coarse beams with different beam direction within a direction range of one coarse beam.

A superframe corresponding to a coarse beam #m starts from a superframe header 63, and the superframe of the coarse beam #m includes a plurality of basic frames. A superframe duration $T_{superframe}$ corresponding to the superframe of the coarse beam #m includes at least one fine beam period $P_{FB}$. For example, the superframe duration $T_{superframe}$ includes a first fine beam period $P_{FB}(g=1)$, a second fine beam period $P_{FB}(g=2)$, . . . , a G-th fine beam period $P_{FB}(g=G)$, where each of the fine beam periods $P_{FB}$ includes a N number of basic frames, and N is equal to the number of the fine beams. Each of the fine beam periods $P_{FB}$ includes the basic frames corresponding to different fine beams. For example, the second fine beam period $P_{FB}(g=2)$ includes a N number of basic frames corresponding to fine beams #0 to #(N−1), where a basic frame 500 is corresponding to the fine beam #1 (i.e., the basic frame 500 is transmitted via the fine beam #1). If the each of the superframes in the frame structure 61 includes the N number of the basic frames and each of the basic frames is repeatedly transmitted for a G number of times during one superframe duration $T_{superframe}$, the fine beam period $P_{FB}$ includes a (N*G) number of basic frames, and the fine beam period $P_{FB}$ is equal to $N*G*T_{frame}$ (milliseconds).

It should be particularly noted that, the user equipment 200 can perform the fine beam acquirement by using a frame header 501 of the basic frame 500. The user equipment 200 can determine a preferred fine beam by a measurement of a downlink signal or an estimation based on an uplink signal. In an exemplary embodiment, the user equipment 200 can select the preferred fine beam according to the measurement of the downlink signal in case an angle of arrival (AOA) method cannot be performed. In other words, the fine beam acquirement can include: the user equipment 200 performs a measurement of a sounding reference signal (SRS) by using the frame header 501 of the basic frame 500 via the uplink, or the user equipment 200 receives a measure signal related to the fine beam #1 by using the frame header 501 of the basic frame 500 via the uplink and transmits back fine beam signal parameters or a fine beam search result related to the fine beam #1. The fine beam search result is, for example, a beam index of the preferred fine beam, and the fine beam signal parameters are, for example, related parameters for determining the quality of signal accepting state of the fine beam, such as received signal strength indicator (RSSI) or the signal-to-noise ratio (SNR), but the present disclosure is not limited thereto. In an exemplary embodiment, in response to a plurality of measure signals respectively corresponding to the fine beams received via the fine beams, the user equipment 200 transmits the fine beam signal parameters respectively corresponding to the fine beams or the fine beam search result via the fine beams. For example, the user equipment 200 may be set to transmit the fine beam signal parameters to the base station 100 via the physical uplink control channel (PUCCH).

In other words, the frame header of each of the basic frames is periodically sent via the corresponding fine beam. After the preferred fine beam is determined from the fine beams by the user equipment 200 based on the AOA method or said fine beam signal parameters, the base station 100 can schedule the basic frame corresponding to the preferred fine beam in order to perform the data packet transmission with the user equipment 200 by using the preferred fine beam. For example, when the user equipment 200 selects the fine beam #1 as the preferred fine beam by using the frame header 501, the base station 100 can schedule a packet transmission block 502 of the basic frame 500 corresponding to the fine beam #1, so as to perform the data packet transmission by using the packet transmission block 502 via the fine beam #1.

Figure 7:
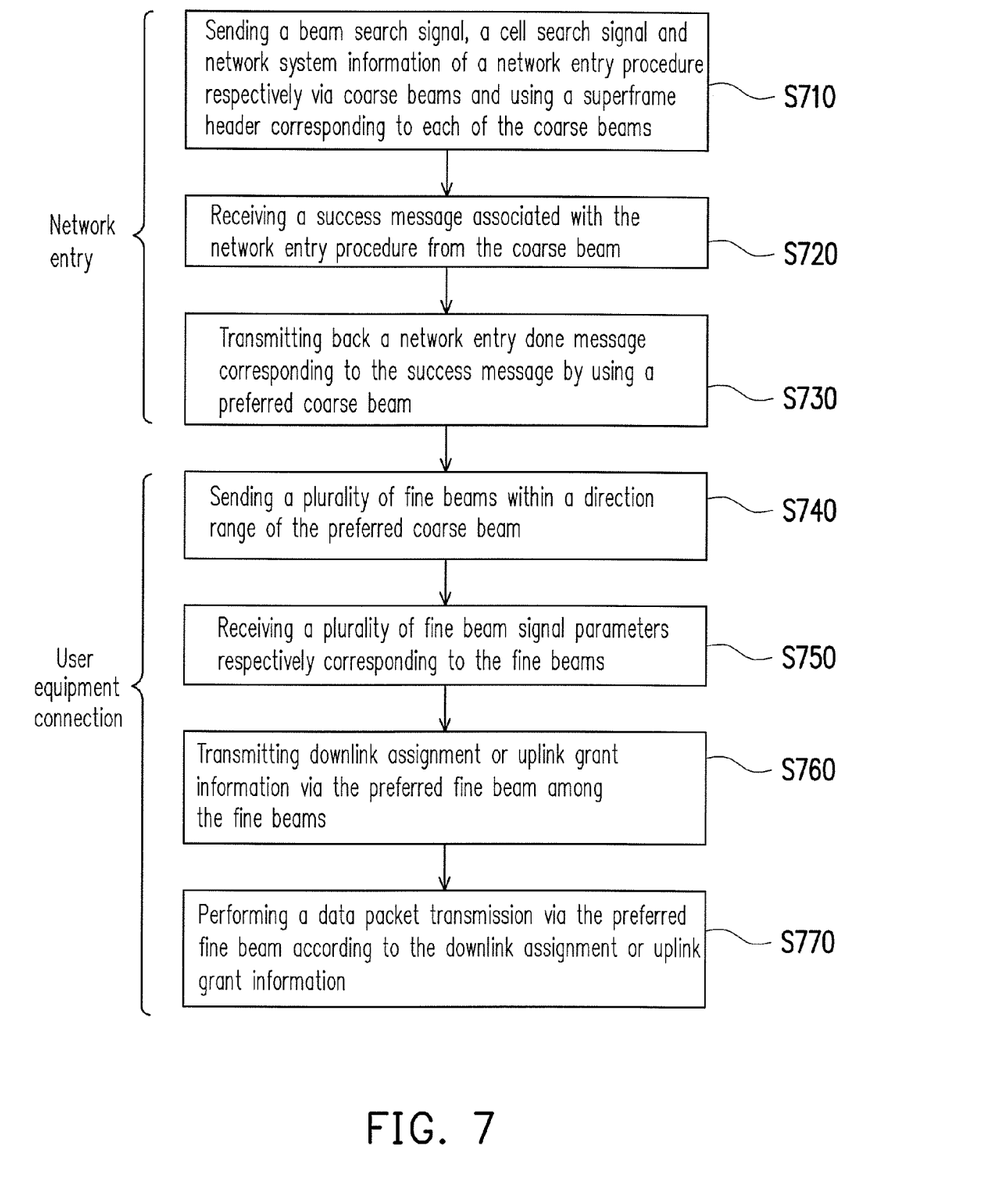
FIG. 7 is a flowchart illustrating the hierarchical beamforming method operated by the base station according to an exemplary embodiment of the present disclosure.

FIG. 7 is a flowchart illustrating the hierarchical beamforming method operated by the base station according to an exemplary embodiment of the present disclosure. In step S710, the base station 100 sends a beam search signal, a cell search signal and network system information of a network entry procedure respectively via coarse beams and using a superframe header corresponding to each of the coarse beams. In step S720, the base station 100 receives a success message associated with the network entry procedure from the coarse beam. In step S730, the base station 100 transmits back a network entry done message corresponding to the success message by using a preferred coarse beam. Herein, steps S710 to S730 refer to a stage when the base station 100 performs the coarse beam acquirement and the network entry procedure by using the coarse beams.

In step S740, the base station 100 sends a plurality of fine beams within a direction range of the preferred coarse beam. In step S750, the base station 100 receives a plurality of fine beam signal parameters respectively corresponding to the fine beams or a fine beam search result. In step S760, the base station 100 transmits downlink assignment (DL assignment) information or uplink grant (UL grant) information via the preferred fine beam among the fine beams. In step S770, the base station 100 performs a data packet transmission via the preferred fine beam according to the DL assignment information or the UL grant information. Herein, steps S740 to S770 refer to a stage when the base station 100 performs the fine beam acquirement and the data packet transmission by using the fine beams.

Figure 8:
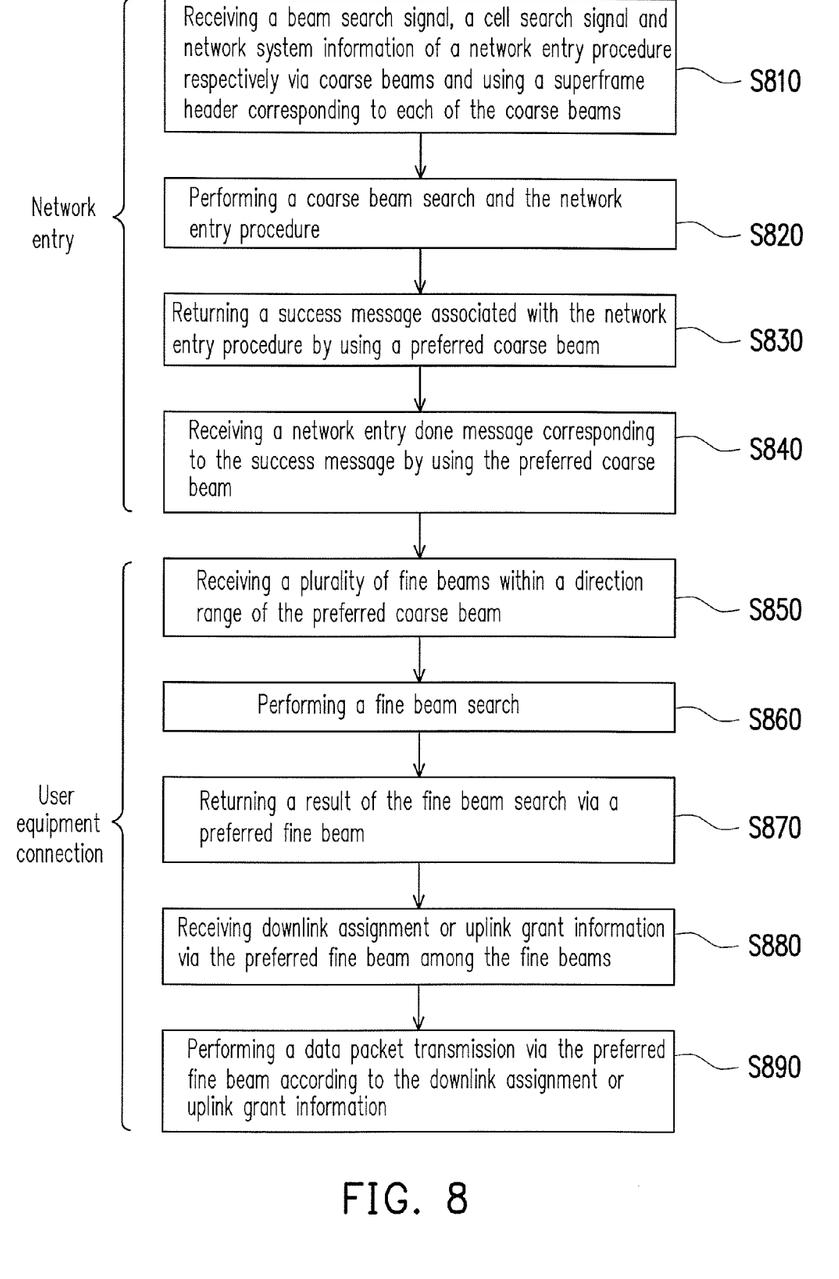
FIG. 8 is a flowchart illustrating the hierarchical beamforming method operated by the user equipment according to an exemplary embodiment of the present disclosure.

FIG. 8 is a flowchart illustrating the hierarchical beamforming method operated by the user equipment according to an exemplary embodiment of the present disclosure. In step S810, the user equipment 200 receives a beam search signal, a cell search signal and network system information of a network entry procedure respectively via coarse beams and using a superframe header corresponding to each of the coarse beams. In step S820, the user equipment 200 performs a coarse beam search and the network entry procedure. Specifically, during a coarse beam forming period, the user equipment 200 receives at least one of the coarse beams, so as to perform the network entry procedure by using a superframe header transmitted via the at least one of the coarse beams. In step S830, the user equipment 200 returns a success message associated with the network entry procedure by using a preferred coarse beam. In step S840, the user equipment 200 receives a network entry done message corresponding to the success message by using the preferred coarse beam. Herein, steps S810 to S840 refer to a stage when the user equipment 200 performs the coarse beam acquirement and the network entry procedure by using the coarse beams.

In step S850, the user equipment 200 receives a plurality of fine beams within a direction range of the preferred coarse beam. In step S860, the user equipment 200 performs a fine beam search. In step S870, the user equipment 200 returns a result of the fine beam search via a preferred fine beam. In step S880, the user equipment 200 receives downlink assignment (DL assignment) information or uplink grant (UL grant) information via the preferred fine beam among the fine beams. In step S890, the user equipment 200 performs a data packet transmission via the preferred fine beam according to the DL assignment information or the UL grant information. Herein, steps S850 to S890 refer to a stage when the user equipment 200 performs the fine beam acquirement and the data packet transmission by using the fine beams.

In summary, the base station and the user equipment in the present disclosure can perform the network entry procedure via the coarse beams with greater beamwidth, and perform the data packet transmission via the fine beams with smaller beamwidth. The time required by the user equipment to enter the network may be reduced by using the coarse beams with wider beamwidth to perform the network entry procedure, and the user equipment may be ensured to transmit data with high antenna gain by using the fine beams with higher mobility and narrower beamwidth to perform the data packet transmission. Accordingly, the hierarchical beamforming method of the present disclosure is capable of saving the time used by the user equipment to perform the network entry procedure, and providing a method that can effectively manage beams and select the most preferred beam for transmission.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A hierarchical beamforming method, adapted to a base station, and comprising:
performing a network entry procedure via a plurality of coarse beams by respectively using a superframe header of a superframe corresponding to each of the coarse beams;
receiving a success message of the network entry procedure via one of the coarse beams; wherein the success message comprises a random access preamble;
identifying said one of the coarse beams as the preferred coarse beam, so as to transmit back a network entry done message in response to the success message by using the preferred coarse beam; and
performing a user equipment connection via a plurality of fine beams within a direction range of the preferred coarse beam, so as to determine a preferred fine beam from the fine beams by using frame headers of a plurality of basic frames respectively corresponding to the fine beams, and performing a data packet transmission by using a packet transmission block of the basic frame corresponding to the preferred fine beam.

2. The hierarchical beamforming method of claim 1, wherein the superframe corresponding to the preferred coarse beam comprises the basic frames respectively corresponding to the fine beams, and a beamwidth of the coarse beams is greater than a beamwidth of the fine beams.

3. The hierarchical beamforming method of claim 2, wherein direction ranges of the fine beams within the direction range of the preferred coarse beam are different from one another and overlapped with the direction range of the preferred coarse beam.

4. The hierarchical beamforming method of claim 2, wherein the step of performing the network entry procedure via the coarse beams by respectively using the superframe header of the superframe corresponding to each of the coarse beams comprises:
configuring the superframe corresponding to each of the coarse beams, so as to associate the coarse beams with the corresponding superframe respectively; and
during a coarse beam forming period, forming each of the coarse beams, wherein the superframe header transmitted via each of the coarse beams comprises network system information of the network entry procedure, a beam search signal, a cell search signal and a downlink control signal.

5. The hierarchical beamforming method of claim 4, wherein a coarse beam period comprises a M number of the superframes respectively corresponding to the coarse beams, and M is a positive integer equal to the number of the coarse beams.

6. The hierarchical beamforming method of claim 4, wherein the beam search signal provides beam search, frequency synchronism and timing information for a user equipment under a coverage of the coarse beams.

7. The hierarchical beamforming method of claim 2, wherein the step of determining the preferred fine beam from the fine beams by using the frame headers of the basic frames respectively corresponding to the fine beams comprises:
    in response to transmitting a beam search signal and/or a measure signal via the fine beams by using the frame header of each of the basic frames, receiving a plurality of fine beam signal parameters respectively corresponding to the fine beams or a fine beam search result via the fine beams; and
    selecting the preferred fine beam from the fine beams according to the fine beam signal parameters or the fine beam search result.

8. The hierarchical beamforming method of claim 2, further comprising:
    transmitting downlink assignment information or uplink grant information via the preferred fine beam among the fine beams.

9. The hierarchical beamforming method of claim 1, wherein a superframe duration of the superframe comprises at least one fine beam period, the at least one fine beam period comprises a N number of the basic frames, and N is equal to the number of the fine beams.

10. A base station, comprising:
    a transceiver circuit, configured to transmit and receive a wireless signal; and
    a processing circuit, coupled to the transceiver circuit, and configured to:
    perform a network entry procedure via a plurality of coarse beams by respectively using a superframe header of a superframe corresponding to each of the coarse beams;
    receive a success message associated with the network entry procedure via one of the coarse beams; wherein the success message comprises a random access preamble;
    identify said one of the coarse beams as the preferred coarse beam, so as to transmit back a network entry done message corresponding to the success message by using the preferred coarse beam, and
    perform a user equipment connection via a plurality of fine beams within a direction range of the preferred coarse beam, so as to determine a preferred fine beam from the fine beams by using frame headers of a plurality of basic frames respectively corresponding to the fine beams, and perform a data packet transmission by using a packet transmission block of the basic frame corresponding to the preferred fine beam.

11. The base station of claim 10, wherein the superframe corresponding to the preferred coarse beam comprises the basic frames respectively corresponding to the fine beams, and a beamwidth of the coarse beams is greater than a beamwidth of the fine beams.

12. The base station of claim 11, wherein direction ranges of the fine beams within the direction range of the preferred coarse beam are different from one another and overlapped with the direction range of the preferred coarse beam.

13. The base station of claim 11, wherein the processing circuit is further configured to:
    configure the superframe corresponding to each of the coarse beams, so as to associate the coarse beams with the corresponding superframe respectively; and
    during a coarse beam forming period, forming each of the coarse beams, wherein the superframe header transmitted via each of the coarse beams comprises network system information of the network entry procedure, a beam search signal, a cell search signal and a downlink control signal.

14. The base station of claim 13, wherein a coarse beam period comprises a M number of the superframes respectively corresponding to the coarse beams, and M is a positive integer equal to the number of the coarse beams.

15. The base station of claim 13, wherein the beam search signal provides beam search, frequency synchronism and timing information for a user equipment under a coverage of the coarse beams.

16. The base station of claim 11, wherein the processing circuit is further configured to:
    in response to transmitting a beam search and/or measure signal via the fine beams by using the frame header of each of the basic frames, receive a plurality of fine beam signal parameters respectively corresponding to the fine beams or a fine beam search result via the fine beams; and
    select the preferred fine beam from the fine beams according to the fine beam signal parameters or the fine beam search result.

17. The base station of claim 11, wherein the processing circuit is further configured to:
    transmit downlink assignment information or uplink grant information via the preferred fine beam among the fine beams.

18. The base station of claim 11, wherein a superframe duration of the superframe comprises at least one fine beam period, the at least one fine beam period comprises a N number of the basic frames respectively corresponding to the fine beams, and N is equal to the number of the fine beams.

19. A hierarchical beamforming method, adapted to a user equipment, and comprising:
    performing a network entry procedure via a plurality of coarse beams by respectively using a superframe header of a superframe corresponding to each of the coarse beams;
    in response to transmitting a success message associated with the network entry procedure via a preferred coarse beam among the coarse beams, receiving a network entry done message via the preferred coarse beam; wherein the success message comprises a random access preamble; and
    performing a user equipment connection via a plurality of fine beams within a direction range of the preferred coarse beam, so as to determine a preferred fine beam from the fine beams by using frame headers of a plurality of basic frames respectively corresponding to the fine beams, and performing a data packet transmission by using a packet transmission block of the basic frame corresponding to the preferred fine beam.

20. The hierarchical beamforming method of claim 19, wherein the superframe corresponding to the preferred coarse beam comprises the basic frames respectively corresponding to the fine beams, and a beamwidth of the coarse beams is greater than a beamwidth of the fine beams.

21. The hierarchical beamforming method of claim 19, wherein direction ranges of the fine beams within the direction range of the preferred coarse beam are different from one another and overlapped with the direction range of the preferred coarse beam.

22. The hierarchical beamforming method of claim 19, further comprising:
   in response to receiving a plurality of first measure signals respectively corresponding to the coarse beams via the coarse beams, acquiring a plurality of coarse beam signal parameters respectively corresponding to the coarse beams; and
   selecting the preferred coarse beam from the coarse beams according to the coarse beam signal parameters, so as to transmit the success message associated with the network entry procedure by using the preferred coarse beam.

23. The hierarchical beamforming method of claim 19, wherein the step of performing the network entry procedure via the coarse beams by respectively using the superframe header of the superframe corresponding to each of the coarse beams comprises:
   during a coarse beam forming period, receiving at least one of the coarse beams, so as to perform the network entry procedure by using the superframe header transmitted via the at least one of the coarse beams, wherein the superframe header transmitted via each of the coarse beams comprises network system information of the network entry procedure, a beam search signal, a cell search signal and a downlink control signal.

24. The hierarchical beamforming method of claim 23, wherein a coarse beam period comprises a M number of the superframes respectively corresponding to the coarse beams, and M is a positive integer equal to the number of the coarse beams.

25. The hierarchical beamforming method of claim 23, wherein the beam search signal provides beam search, frequency synchronism and timing information for the user equipment under a coverage of the coarse beams.

26. The hierarchical beamforming method of claim 19, wherein the step of performing the data packet transmission via the preferred fine beam among the fine beams within the direction range of the preferred coarse beam comprises:
   in response to receiving a plurality of beam search signals and/or a plurality of second measure signals respectively corresponding to the fine beams via the fine beams by using the frame header of each of the basic frames, transmitting a plurality of fine beam signal parameters respectively corresponding to the fine beams or a fine beam search result via the fine beams; and
   receiving downlink assignment information or uplink grant information via the preferred fine beam among the fine beams.

27. The hierarchical beamforming method of claim 22, wherein a superframe duration of the superframe comprises at least one fine beam period, the at least one fine beam period comprises a N number of the basic frames, and N is equal to a number of the fine beams.

28. A user equipment, comprising:
   a transceiver circuit, configured to transmit and receive a wireless signal; and
   a processing circuit, coupled to the transceiver circuit, and configured to:
      perform a network entry procedure via a plurality of coarse beams by respectively using a superframe header of a superframe corresponding to each of the coarse beams;
      in response to transmitting a success message associated with the network entry procedure via a preferred coarse beam among the coarse beams, receive a network entry done message via the preferred coarse beam; wherein the success message comprises a random access preamble; and
      perform a user equipment connection via a plurality of fine beams within a direction range of the preferred coarse beam, so as to determine a preferred fine beam from the fine beams by using frame headers of a plurality of basic frames respectively corresponding to the fine beams, and perform a data packet transmission by using a packet transmission block of the basic frame corresponding to the preferred fine beam.

29. The user equipment of claim 28, wherein the superframe corresponding to the preferred coarse beam comprises the basic frames respectively corresponding to the fine beams, and a beamwidth of the coarse beams is greater than a beamwidth of the fine beams.

30. The user equipment of claim 28, wherein direction ranges of the fine beams within the direction range of the preferred coarse beam are different from one another and overlapped with the direction range of the preferred coarse beam.

31. The user equipment of claim 28, wherein the processing circuit is further configured to:
   in response to a plurality of first measure signals respectively corresponding to the coarse beams received via the coarse beams, acquire a plurality of coarse beam signal parameters respectively corresponding to the coarse beams; and
   select the preferred coarse beam from the coarse beams according to the coarse beam signal parameters, so as to transmit the success message associated with the network entry procedure by using the preferred coarse beam.

32. The user equipment of claim 28, wherein the processing circuit is further configured to:
   during a coarse beam forming period, receive at least one of the coarse beams, so as to perform the network entry procedure by using the superframe header transmitted via the at least one of the coarse beams, wherein the superframe header transmitted via each of the coarse beams comprises network system information of the network entry procedure, a beam search signal, a cell search signal and a downlink control signal.

33. The user equipment of claim 32, wherein a coarse beam period comprises a M number of the superframes respectively corresponding to the coarse beams, and M is a positive integer equal to the number of the coarse beams.

34. The user equipment of claim 32, wherein the beam search signal provides beam search, frequency synchronism and timing information for the user equipment under a coverage of the coarse beams.

35. The user equipment of claim 28, wherein the processing circuit is further configured to:
   in response to receiving a plurality of beam search signals and/or a plurality of second measure signals respectively corresponding to the fine beams received via the fine beams by using the frame header of each of the basic frames, transmit a plurality of fine beam signal parameters respectively corresponding to the fine beams or a fine beam search result via the fine beams; and receive downlink assignment information or uplink grant information via the preferred fine beam among the fine beams.

36. The user equipment of claim 28, wherein a superframe duration of the superframe comprises at least one fine beam period, the at least one fine beam period comprises a N number of the basic frames, and N is equal to the number of the fine beams.

* * * * *